United States Patent [19]

Wallace et al.

[11] 4,406,874
[45] Sep. 27, 1983

[54] ZRMN$_2$-TYPE ALLOY PARTIALLY SUBSTITUTED WITH CERIUM/PRASEODYMIUM/NEODYMIUM AND CHARACTERIZED BY AB$_2$ STOICHIOMETRY

[75] Inventors: William E. Wallace, Pittsburgh, Pa.; Faiz Pourarian, Qazvin, Iran; Vijay K. Sinha, Bihar, India

[73] Assignee: Koppers Company, Inc., Pittsburgh, Pa.

[21] Appl. No.: 373,640

[22] Filed: Apr. 30, 1982

[51] Int. Cl.$^3$ .................. C22C 22/00; C01B 6/24
[52] U.S. Cl. ............................ 423/644; 420/416; 420/434; 420/422; 420/900
[58] Field of Search .............. 423/644, 648 R; 420/416, 900, 441, 455, 457

[56] References Cited

U.S. PATENT DOCUMENTS 4,228,145 10/1980 Gano et al. .................. 423/644
4,242,315 12/1980 Bruning et al. .............. 423/252

Primary Examiner—L. Dewayne Rutledge
Assistant Examiner—Christopher W. Brody
Attorney, Agent, or Firm—J. Timothy Keane; Donald M. MacKay; Herbert J. Zeh, Jr.

[57] ABSTRACT

A ternary alloy comprised of zirconium, manganese and a third element selected from cerium, praseodymium and neodymium is characterized in having AB$_2$ hexagonal crystal structure and stoichiometry. Members of a preferred class of compounds, represented by the empirical formula $Zr_{x-1}M_xMn_2$ wherein "x" has a value between zero and about 0.3 and M is one of the selected metals, are particularly suitable for use as hydrogen storage materials.

24 Claims, 3 Drawing Figures

PRESSURE-COMPOSITION ISOTHERMS FOR
$Zr_{0.8}Ce_{0.2}Mn_2 - H_2$ SYSTEM

ZRMN$_2$-TYPE ALLOY PARTIALLY SUBSTITUTED WITH CERIUM/PRASEODYMIUM/NEODYMIUM AND CHARACTERIZED BY AB$_2$ STOICHIOMETRY

BACKGROUND OF THE INVENTION

1. Field of the Invention

Many types of intermetallic compounds are known for use as hydrogen storage materials. Of particular interest herein are hydrogen storage materials provided by three-component ZrMn$_2$-type alloys in which zirconium is partially substituted with cerium, praseodymium or neodymium, and which are characterized in having the C14 hexagonal crystal structure and AB$_2$ stoichiometry.

2. State of the Art

A material suitable for storage of hydrogen must satisfy many demanding criteria. In addition to large storage capacity for hydrogen, a hydrogen storage material should absorb and desorb hydrogen quickly, preferably at a pressure near one atmosphere, and the material should show a minimum of hysteresis effects during a hydrogen absorption/desorption cycle.

Intermetallic compounds which have received much attention for use as hydrogen storage materials are provided by derivatives of ZrMn$_2$ compounds, which compounds are characterized by hexagonal C14 crystal structure and AB$_2$ stoichiometry. It is well known that the ZrMn$_2$ system is capable of absorbing copious quantities of hydrogen, but that hydrides formed from the ZrMn$_2$ system are too stable to be of practical significance. In search of improved ZrMn$_2$-type systems, alloys have been prepared which contain other elements substituted for all or a portion of the zirconium, but with the AB$_2$ stoichiometry maintained in the new alloy. For example, in Shaltiel et al, J. Less-Comm. Metals, 53, 117–131 (1977), there are described changes in properties of AB$_2$ Laves-phase ZrMn$_2$-based compounds by substitution of manganese with a 3d transition metal in accordance with the empirical formula Zr(Co$_x$M$_{1-x}$)$_2$ and Zr(Fe$_x$M$_{1-x}$)$_2$ wherein M=V, Cr, Mn and x is between zero and one. Other studies of partial substitution of zirconium in ZrMn$_2$ alloys with titanium to form the hydrides of Ti$_{1-x}$Zr$_x$Mn$_2$ pseudobinaries are described in Oesterreicher et al, Mat. Res. Bull, 13, 83–88 (1978). In Fujii et al, J. Phys. Chem., 85, 3112–16 (1981), ternary alloys are described of the type Zr$_{1-x}$Ti$_x$Mn$_2$ wherein x=0 to 0.5.

SUMMARY OF THE INVENTION

Improved hydrogen storage materials are provided by a ternary alloy consisting of zirconium, manganese and a third element selected from cerium, praseodymium and neodymium, which alloy is characterized in having the C14 hexagonal-type crystal structure and AB$_2$ stoichiometry. A representative family of such alloys may be expressed by the empirical formula $$Zr_{1-x}M_xMn_2 \qquad (I)$$

wherein M=Ce, Pr, Nd and x has a value between zero and about 0.3. Alloys of particular interest within the scope of the formula I family of compounds are as follows:

$$Zr_{0.8}Ce_{0.2}Mn_2$$

$$Zr_{0.7}Ce_{0.3}Mn_2$$

$$Zr_{0.8}Nd_{0.2}Mn_2 \qquad (II)$$

Each of these specific alloys is characterized in having a desirable combination of properties. That is, the alloys have fairly large hydrogen storage capacities along with the capability of forming hydrides less stable than ZrMn$_2$ systems, so as to make these alloys suitable candidates for hydrogen storage materials at elevated temperatures.

DESCRIPTION OF PREFERRED EMBODIMENTS

Figure 1:
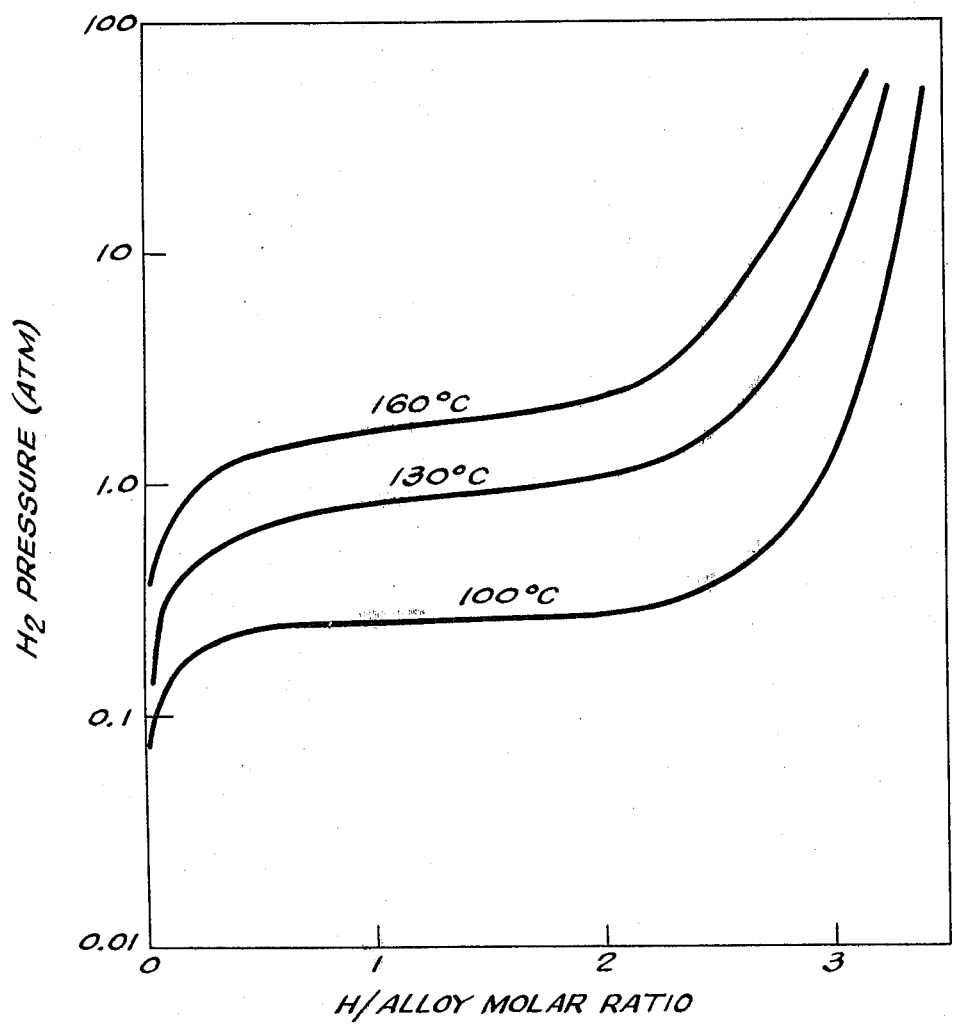
FIG. 1 is an equilibrium pressure-composition isotherm for the system Zr$_{0.8}$Ce$_{0.2}$Mn$_2$—H$_2$, which is a representative ternary alloy hydride of the invention.

A ternary alloy of the invention is characterized generally as a Laves-phase intermetallic compound composed of zirconium, manganese and a third element selected from the group consisting of cerium, praseodymium and neodymium in a C14 hexagonal crystal structure. The crystal structure for each of the specific compounds, of II above, is characterized by lattice parameters having approximate values in the following ranges:

$$a = 5.00 \text{ Å to } 5.03 \text{ Å}$$

$$c = 8.20 \text{ Å to } 8.26 \text{ Å}$$

A general procedure for preparation of these ternary alloys follows. Weighed amounts of the constituents zirconium and the third element (cerium, or praseodymium, or neodymium) are placed in a copper boat for heating to a fusing temperature. Heating is accomplished typically by means of an r.f. 450 KHz induction heater. The copper boat is mounted inside a vacuum-tight quartz tube through which a stream of Ti-gettered argon passes during the heating period. Fusing of the constituents takes place by heating a mixture of the constituents to about 1600° C. in about two minutes, and holding at that temperature for about two minutes. Then the sample is cooled to room temperature in a period of about one minute and the hardened sample is turned over in the boat. Melting and cooling are repeated through four cycles, typically. After the first cycle, a weighed amount of manganese, which includes an eight percent stoichiometric excess over the amount of manganese desired in the final sample is added to the fused sample of zirconium and the selected third element. Excess manganese is required to compensate for loss of manganese by evaporation. Then the sample is annealed for a period of about two hours at about 1000° C. X-ray diffraction analysis of the annealed sample typically shows a material consisting of a single phase.

In order to activate the sample to make it suitable as a hydrogen storage material, about two grams of the annealed sample is placed in a stainless-steel pressure reactor vessel suitable for use in forming a hydride of the sample. The reactor is evacuated to a pressure of about $10^{-3}$ Torr. Then pure hydrogen is pumped into the reactor to a pressure of about 40 to 50 atm., with the reactor vessel temperature initially at about 25° C., until hydrogen is no longer absorbed by the sample. Usually, within two minutes of the time hydrogen is initially introduced into the reactor, the reaction vessel temperature increases to about 50° C. Then the reactor is allowed to cool to room temperature over a period of about 30 minutes, after which time the pressure within the reactor is usually about 45 atm. The pressure in the reactor is reduced to ambient, and then the sample is subjected to a pressure of about $10^{-3}$ Torr for about 20 minutes in order for the sample to desorb substantially all of the previously-absorbed hydrogen.

In order to obtain a fully-activated hydrogen storage material, the sample is subjected to about 25 sorption-desorption cycles, under conditions as described for the activation procedure above. At the end of this activating period, there is obtained a repeatable pressure-composition profile. To obtain crystal structure data on the hydrides, a portion of the activated sample is hydrogenated to a known composition in accordance with the previously-established pressure-composition isotherm. Then the hydrogenated sample is cooled quickly by quenching the sample boat (reactor) in liquid nitrogen, and rapidly pumping away remaining gaseous hydrogen. In accordance with the technique of Gualtieri et al. [J. Appl. Phys., 47, 3432 (1976)], a few Torr of $SO_2$ is admitted to the reaction vessel to poison the surface of the sample, and thereby seal in the hydrogen. After the sample warms to room temperature, X-ray diffraction data are obtained for the sample.

In order to demonstrate the preparation of the ternary alloys of the invention and their hydrides, and to obtain data as to characteristics and properties of the alloys, three ternary alloys were actually prepared in accordance with the aforementioned, generally-described procedures. Essential parameters such as constituent weights, melting and annealing temperatures, lattice parameters and hydriding characteristics are summarized in Tables I-II. The cerium and neodymium constituent were 99.9 percent pure and used as obtained from NUCOR Corp., Research Chemicals Div., Phoenix, AZ. The zirconium and manganese constituents were at 99.999 percent purity were used as obtained from Alfa Products, Ventron Div., Danvers, MA.

Figure 2:
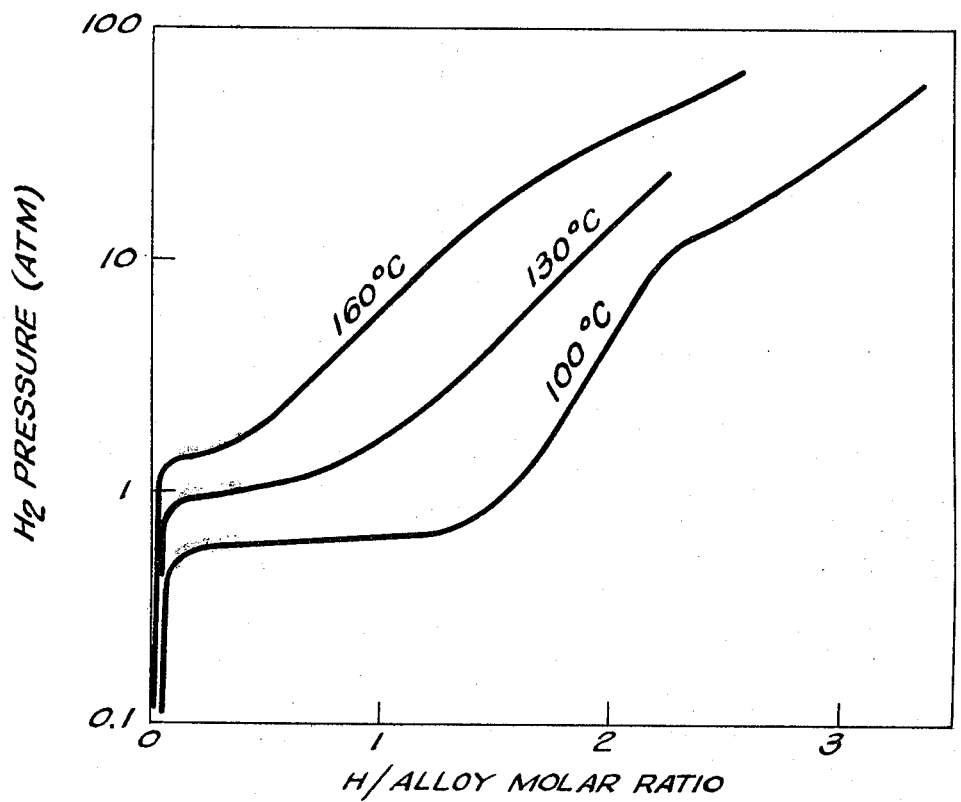
FIG. 2 is an equilibrium pressure-composition isotherm for the system Zr$_{0.7}$Ce$_{0.3}$Mn$_2$—H$_2$, which is another representative ternary alloy hydride of the invention.

The pressure-composition isotherms of FIGS. 1 and 2 for two representative embodiments of the zirconium-cerium-manganese alloy system of the invention, demonstrate important advantages of this ternary system over conventional $ZrMn_2$ systems. For example, at elevated temperatures these two alloy systems depicted can be hydrogenated and dehydrogenated at hydrogen pressures at about one atm.

Figure 3:
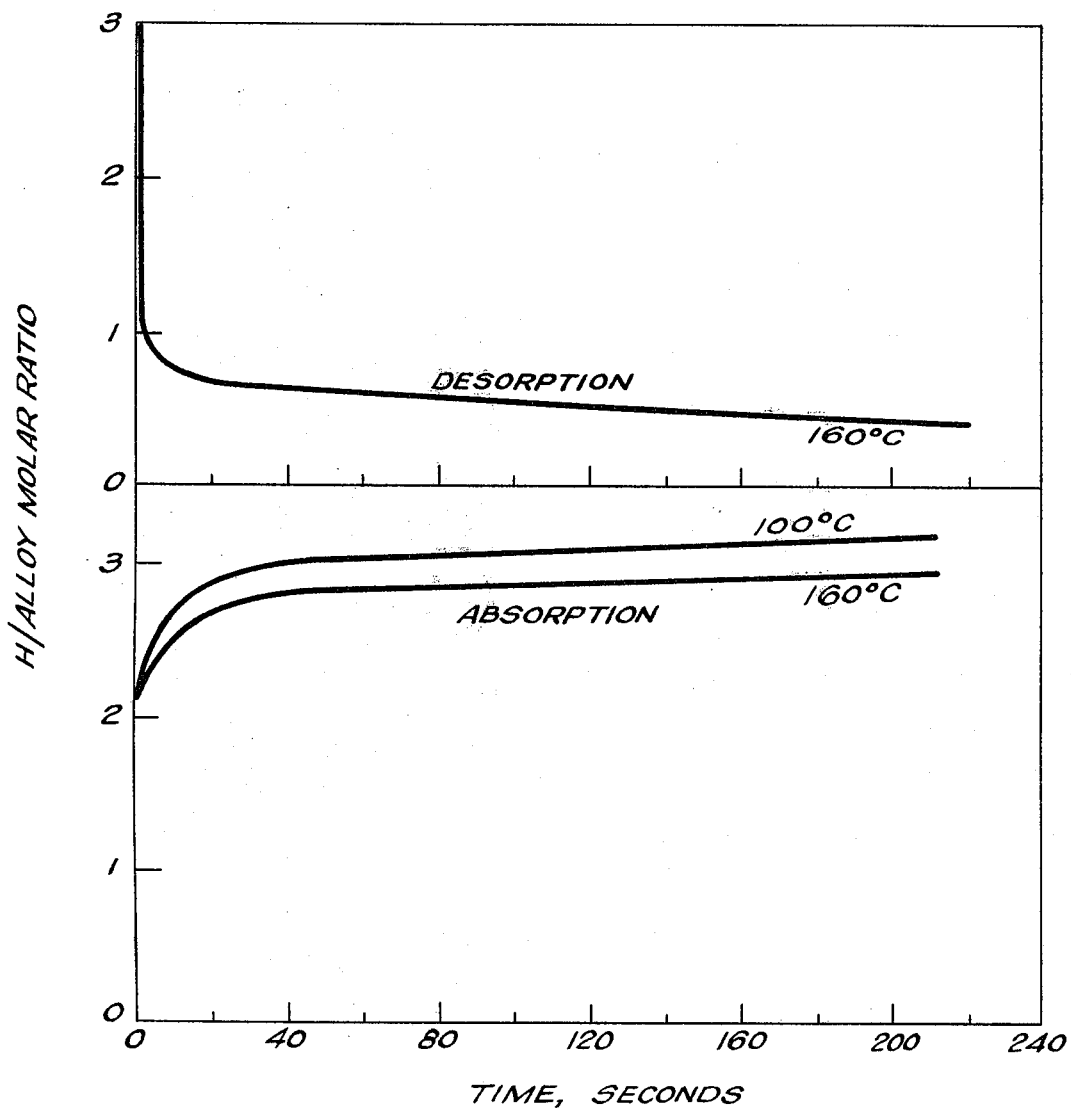
FIG. 3 is a plot of the rates of absorption and desorption description of hydrogen by the system Zr$_{0.8}$Ce$_{0.2}$Mn$_2$ at various temperatures.

The ternary alloys of the invention are also characterized by very rapid absorption/desorption of hydrogen. As shown in FIG. 3, a condition of 90 percent complete desorption or absorption of hydrogen can be obtained in less than about 30 seconds.

TABLE I

Preparation of $Zr_{1-x}M_xMn_2$ Ternary Alloys Wherein M = Ce, Nd

| Sample No. | Alloy | Amount of Each Constituent (gm) | | | Melting Temp (°C.) | Heat Treatment | | | | Sample Wt. Loss During Preparation (gm) |
|---|---|---|---|---|---|---|---|---|---|---|
| | | | | | | Melting Cycles | | Annealing | | |
| | | Zr | M | Mn | | No. | Melt Period (Min) | Temp (°C.) | Period (Hrs) | |
| I | $Zr_{0.8}Ce_{0.2}Mn_2$ | 1.500 | 0.560 | 2.439 | ~1500 | 5 | 3 | ~1000 | 2 | 0.011 |
| II | $Zr_{0.7}Ce_{0.3}Mn_2$ | 1.162 | 0.536 | 2.161 | ~1500 | 4 | 3 | ~1000 | 2 | 0.013 |
| III | $Zr_{0.8}Nd_{0.2}Mn_2$ | 1.461 | 0.578 | 2.376 | ~1500 | 4 | 3 | ~1000 | 2 | 0.008 |

TABLE II

Lattice Parameters and Hydrogen Absorption for $Zr_{x-1}M_xMn_2$ Ternary Alloys Wherein M = Ce, Nd

| Sample No. | Alloy/ Alloy Hydride | Lattice Parameters | | Unit Cell Volume $V(A)^3$ | Change In Unit Cell Volume In Forming Hydride V/V % | Hydrogen Storage Capacity ml $H_2$ per gm alloy (@ 40 atm) | Activation Temp (°C.) |
|---|---|---|---|---|---|---|---|
| | | a(A) | c(A) | | | | |
| I | $Zr_{0.8}Ce_{0.2}Mn_2$ | 5.005 | 8.024 | 178 | 22.5 | | |
| | $Zr_{0.8}Ce_{0.2}Mn_2H_{3.40}$ | 5.379 | 8.696 | 218 | | 197 | 100 |
| | $Zr_{0.8}Ce_{0.2}Mn_2H_{3.25}$ | | | | | 188 | 130 |
| | $Zr_{0.8}Ce_{0.2}Mn_2H_{3.10}$ | | | | | 180 | 160 |
| II | $Zr_{0.7}Ce_{0.3}Mn_2$ | 4.998 | 8.195 | 177 | | | |
| | $Zr_{0.7}Ce_{0.3}Mn_2H_{3.2}$ | 5.367 | 8.659 | 216 | 21.8 | 181 | 100 |
| III | $Zr_{0.8}Nd_{0.2}Mn_2$ | 5.014 | 8.200 | 179 | 20.0 | | |
| | $Zr_{0.8}Nd_{0.2}Mn_2H_{3.5}$ | 5.344 | 8.651 | 214 | | 202 | 100 |

Although specific examples of the invention have been set forth hereinabove, it is not intended that the invention be limited solely thereto, but is to include all the variations and modifications falling within the scope of the appended claims.

What is claimed is:

1. A ternary alloy provided by elements in an atomic ratio expressed by the formula:

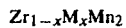

$Zr_{1-x}M_xMn_2$ wherein "M" is selected from the group consisting of cerium, praseodymium and neodymium, and wherein "x" has a value between zero and about 0.3.

2. The alloy of claim 1 expressed by the formula:

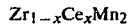

$Zr_{1-x}Ce_xMn_2$ wherein "x" has a value between zero and about 0.3.

3. The alloy of claim 1 expressed by the formula

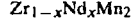

$Zr_{1-x}Nd_xMn_2$ wherein "x" has a value between zero and about 0.2.

4. The hydrides of compounds of claim 1.

5. A Laves phase intermetallic compound provided by a ternary alloy comprising zirconium, manganese and a third element selected from the group consisting of cerium, praseodymium and neodymium, the intermetallic compound having a C14-type crystal structure in which said third element is substituted for zirconium so as to maintain substantially $ZrMn_2$ stoichiometry, the crystal structure characterized by lattice parameters of $a = 4.99$ Å to $5.03$ Å

$c = 8.19$ Å to $8.26$ Å

6. The ternary alloy of claim 5 wherein the third element is cerium and the crystal structure is characterized by lattice parameters of $a = 4.99$ Å to $5.03$ Å

$c = 8.19$ Å to $8.26$ Å

7. The ternary alloy of claim 5 wherein the third element is neodymium and the crystal structure is characterized by lattice parameters of $a = 4.99$ Å to $5.03$ Å

$c = 8.19$ Å to $8.26$ Å.

8. The ternary alloy of claim 5 wherein the third element is cerium and the atomic ratios of the three elements fall within ranges expressed by the formula $Zr_{1-x}Ce_xMn_2$ wherein "x" has a value between zero and about 0.3.

9. The ternary alloy of claim 8 wherein "x" has a value of about 0.2.

10. The ternary alloy of claim 8 wherein "x" has a value of about 0.3.

11. The hydrides of ternary alloys of claim 8.

12. The ternary alloy of claim 5 wherein the third element is neodymium and the atomic ratios of the three elements fall within ranges expressed by the formula $Zr_{1-x}Nd_xMn_2$ wherein "x" has a value between zero and about 0.2.

13. The ternary alloy of claim 12 wherein "x" has a value of about 0.2.

14. The hydrides of ternary alloys of claim 12.

15. A method for forming a hydride of an alloy comprising the steps of (a) preparing a ternary alloy of zirconium, manganese and a third element selected from cerium, praseodymium and neodymium, said alloy capable of storing hydrogen as hydride of the alloy;

(b) subjecting the alloy to hydrogen so that hydrogen is absorbed into the alloy.

16. The method of claim 15 further characterized by the step of decomposing the hydride to cause desorption of hydrogen from the alloy.

17. An alloy having the empirical formula $Zr_{0.8}Ce_{0.2}Mn_2$

18. An alloy having the empirical formula $Zr_{0.7}Ce_{0.3}Mn_2$.

19. An alloy having the empirical formula $Zr_{0.8}Nd_{0.2}Mn_2$.

20. A hydride having the empirical formula $Zr_{0.8}Ce_{0.2}Mn_2H_{3.4}$.

21. A hydride having the empirical formula $Zr_{0.8}Ce_{0.2}Mn_2H_{3.25}$.

22. A hydride having the empirical formula $Zr_{0.8}Ce_{0.2}Mn_2H_{3.1}$.

23. A hydride having the empirical formula $Zr_{0.7}Ce_{0.3}Mn_2H_{3.2}$.

24. A hydride having the empirical formula $Zr_{0.8}Nd_{0.2}Mn_2H_{3.5}$.

* * * * *